Mar. 3, 1925.
W. H. SCHILL
1,528,575
AUTOMOBILE RADIATOR SHUTTER
Filed Dec. 1, 1922
2 Sheets-Sheet 1
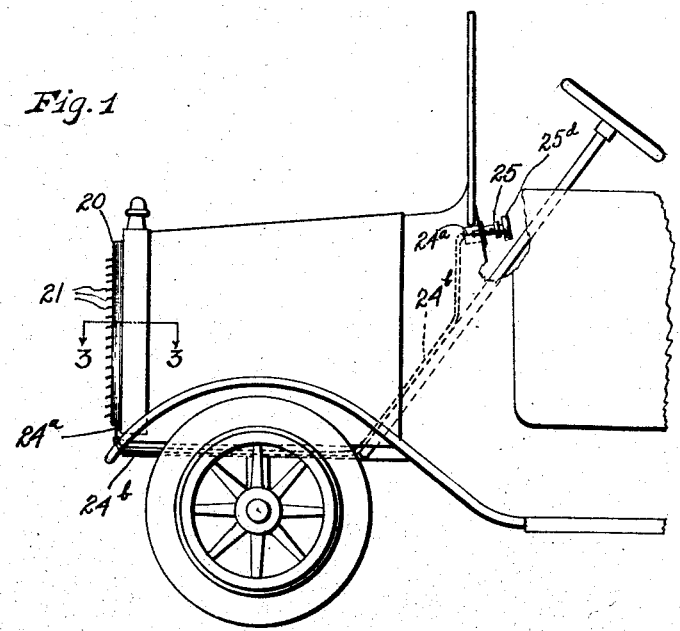
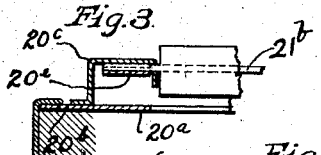
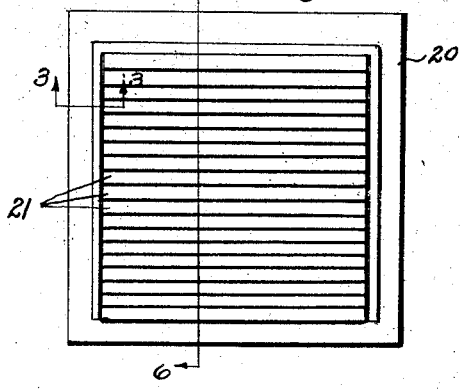
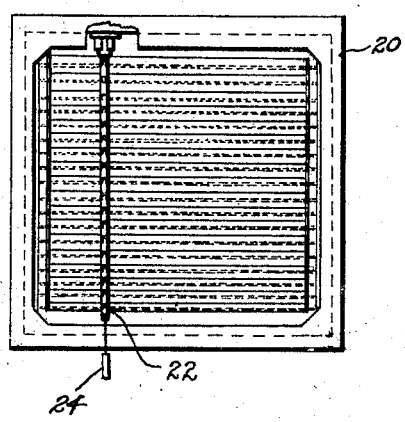
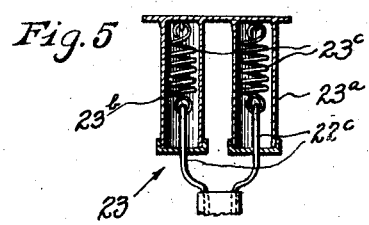
Inventor
WILLIAM H. SCHILL
By Wm C McCoy
Attorney

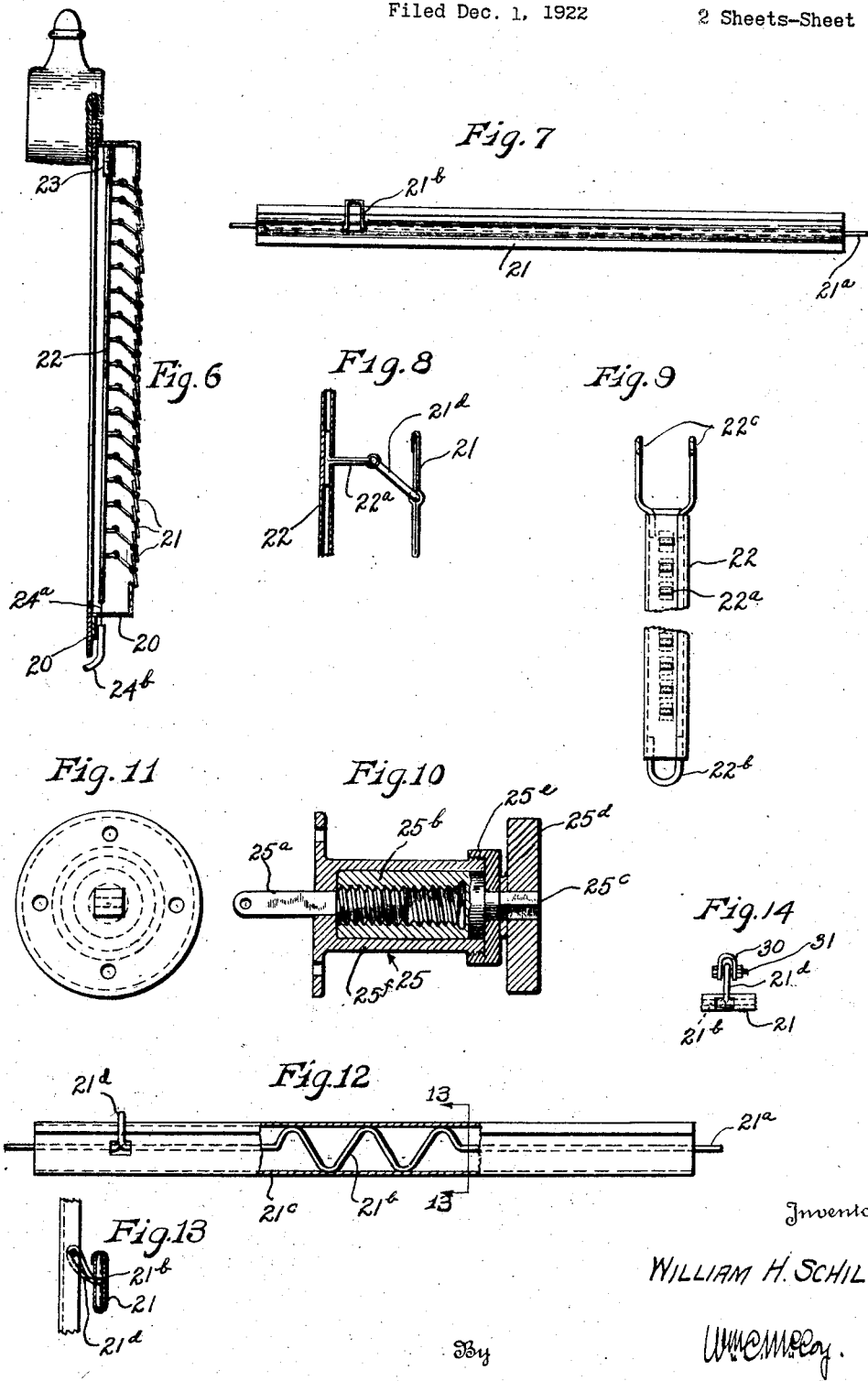

Patented Mar. 3, 1925.

1,528,575

UNITED STATES PATENT OFFICE.

WILLIAM H. SCHILL, OF AKRON, OHIO.

AUTOMOBILE RADIATOR SHUTTER.

Application filed December 1, 1922. Serial No. 604,206.

*To all whom it may concern:*

Be it known that I, WILLIAM H. SCHILL, a citizen of the United States, and resident of Akron, Ohio, have invented new and useful Improvements in Automobile Radiator Shutters, of which the following is a specification.

My invention relates to shutters for use with automobile radiators and it particularly contemplates an improved shutter of inexpensive manufacture, that may be readily installed on Ford cars and the like.

Shutters for automobile radiators have previously been proposed which were adapted to be controlled from the dash board of the automobile but in all such cases, at least a portion of the control machinery is exposed to injury and presents an unsightly appearance. Furthermore, in all shutter systems of this nature with which I am familiar, the operation is very unreliable and the shutter is expensive to construct.

Centrally mounted shutter vanes have also been proposed but my invention contemplates an improved construction of both the vane and the operating mechanism.

One object of my invention is to provide an inexpensive shutter that is adapted to be operated from the dash board of the car and one in which all operating parts except the shutter vanes, are enclosed in the casing of the shutter.

Another object of my invention is to provide a more reliable means for actuating a shutter of this type and to provide a means that is free from all rattles.

A third object of my invention is to provide a shutter that can be readily and quickly attached to or detached from an automobile.

Another object of my invention is to provide a particularly novel shutter vane construction and an improved means of controlling the operation of said vane.

An additional object is to provide an improved form of control for actuating the shutter from the dash board of the car.

Other objects of my invention that distinguish it from previously proposed structures will be apparent from a perusal of the specification and accompanying drawings in which:

Fig. 1 is a side elevational view with parts broken away, of a shutter constructed in accordance with my invention and installed on an automobile;

Fig. 2 is a front elevational view of the shutter;

Fig. 3 is a detailed sectional view taken substantially on line 3—3 of Fig. 2;

Fig. 4 is a rear elevational view, with parts broken away, of my shutter device;

Fig. 5 is a sectional detailed rear view of a spring arrangement for maintaining the shutter vanes in their closed positions;

Fig. 6 is a side sectional view on the line 6—6 of Fig. 2;

Fig. 7 is a detailed view of one of the shutter vanes;

Fig. 8 illustrates the method of connecting each of the vanes to the operating shaft;

Fig. 9 is a detailed view of the operating shaft;

Fig. 10 is a sectional side view of the control mechanism that is mounted on the dash board;

Fig. 11 is a rear elevation view of the mechanism shown in Fig. 10;

Fig. 12 is a detailed view of one of the shutter vanes;

Fig. 13 is a sectional view on line 13—13 of Fig. 12 and Figure 14 is a detail view of a modification of the connection between the rod and vanes.

My invention broadly contemplates a casing 20 in which a series of overlapping damper vanes 21 are pivotally mounted. A control rod 22, which is moved to its uppermost position by means of the spring arrangement 23, is connected to each vane and is adapted to maintain the damper device closed. A control cable 24 extends from the bottom of the control rod 22 to an operating mechanism 25 that is mounted on the dash board of the automobile.

Fig. 3 shows a sectional view of the casing 20 and a method of mounting the vanes 21 in the casing to secure absolute rigidity of the structure and improved mounting for the vanes. The base portion 20ª has a series of holes 20ᵇ by means of which it is secured to the radiator of the automobile. A box 20ᶜ is secured to the base portion and has its inner edge bent inwardly to present a bearing face for the ends of the damper vanes. A strap 20ᵉ having a series of lateral corrugations for receiving the pivot pins of the vanes, is mounted internally of the casing 20 to provide a bearing bracket for the vanes. All of these members, it will be noted, can be formed from pressed metal and be welded or otherwise connected to form an inexpensive casing.

Each of the vanes 21 has a pivot pin 21ª at each end that is formed from a wire 21ᵇ that extends therethrough. This wire 21ᵇ can either be soldered in place or it can be secured in the manner shown in Figs. 12 and 13. A number of flat bends in the wire constitute a frame about which the sheet metal vane is bent. This operation can be done in a suitable press that folds the sheet metal 21ᶜ about the wire. No soldering or brazing is necessary for a vane of this type since it is held in place on the wire by the loops 21ᵈ.

The operating rod 22 has a series of hooks or loops 22ª that engage the loops 21ᵈ of the vanes to actuate them. This rod is also formed of pressed metal with an inserted loop 22ᵇ at the bottom and a two point spring support 23 at the top. This rod is illustrated in Fig. 9 and a modification of it in Fig. 14 that is particularly desirable.

The loops 21ᵈ of the vanes may in some instances, be twisted into a vertical plane where they may be engaged between the sides of the channeled operating rod 30. This rod has a series of bolts 31 that enter the loops 21ᵈ to operate the vanes.

The spring casing 23 is formed with two chambers 23ª and 23ᵇ each of which contains a helical spring 23ᶜ. The springs each act upon the respective hooks 22ᶜ. The spring casing is securely mounted in the top of the casing 20 and the spring elements are separated a sufficient degree to prevent turning of the bar.

The bottom of the operating rod connects to a control cable 24ª that extends thru a tube 24ᵇ to the dash board of the car. The other end of the control cable connects to a shaft 25ª by means of which the shutters are opened and closed.

The shaft 25ª is square with a threaded shank that is engaged by the threaded sleeve 25ᵇ which terminates in a shaft 25ᶜ upon which the operating wheel 25ᵈ is mounted. A bushing 25ᵉ holds the sleeve in place on the mounting 25ᶠ that is secured to the dash board. Thus by turning the knurled head 25ᵈ shaft 25ª moves in and out of a square opening formed in the end of the mounting 25ᶠ.

My shutter can be secured to the front of any automobile by being placed inside the edges of the shell of the radiator so that the flanges of the shutter casing 20 are retained between the radiator shell and the radiator. The simplicity of this attachment will be appreciated when it is considered that the shell of the ordinary radiator is readily removed by unfastening the two legs of the shell and lifting it vertically.

By turning the head 25ᵈ in one direction the operating rod is drawn down and this opens the several vanes. If the head 25ᵈ is turned in the opposite direction, it permits the springs 23 to pull the shutters to their closed positions. By mounting the shutters at their centers, the jar of the car does not cause them to rattle since they are balanced and their setting remains constant. If they were pivoted along one side there would be considerable rattle.

I desire that only such limitations shall be imposed upon the spirit and scope of my invention as are set forth in the accompanying claims.

What I claim is:

1. A shutter for automobile radiators comprising a plurality of pivotally mounted shutters, a vertical bar connected to each of said shutters, a plurality of helical springs mounted at the top of said bar and adapted to move said shutters to a closed position, said springs being separated a sufficient distance to prevent turning of said bar, a control cable connected to the lower end of said bar and extending to the dash board of the automobile, and means for operating said cable to open said shutters.

2. A shutter vane for automobile radiators comprising a wire having a series of sinuous bends therein of substantially the width of the vane and disposed in the plane of the vane, a loop of said wire extending at an angle to the plane of the vane, and a piece of metal enclosing the sinuous bends of said wire, the ends of said wire extending beyond the metal to provide pivot members.

3. A shutter for use with an automobile radiator embodying a pivotally mounted vane comprising a wire having a series of sinuous bends of uniform width disposed in the plane of the vane, a single loop of said wire extending at an angle to the plane of said vane, and a covering of sheet metal enclosing the sinuous bends of said wire to form a rectangular vane, the ends of said wire extending beyond said metal to provide pivots for said vane, said loop extending through the metal sheet to engage means for controlling the position of said shutter.

4. A shutter vane for use with automobile radiators comprising a wire having a bend in the plane of the vane, a loop extending at an angle to the plane of the vane for operating the vane, a metal covering enclosing said wire to form the surface of said vane, said loop extending through an aperture in said covering and the ends of said wire extending beyond said metal covering to provide pivots for said vane.

In witness whereof, I have hereunto signed my name in the presence of a subscribing witness.

WILLIAM H. SCHILL.

Witness:
Wm. C. McCoy.